United States Patent [19]

Elmer et al.

[11] Patent Number: 5,534,677
[45] Date of Patent: Jul. 9, 1996

[54] ELECTRON BEAM MACHINING USING ROTATING AND SHAPED BEAM POWER DISTRIBUTION

[75] Inventors: John W. Elmer, Pleasanton; Dennis W. O'Brien, Livermore, both of Calif.

[73] Assignee: Regents of the University of California, Oakland, Calif.

[21] Appl. No.: 33,607

[22] Filed: Mar. 18, 1993

[51] Int. Cl.$^6$ .................................................. B23K 15/00
[52] U.S. Cl. ............................. 219/121.35; 219/121.13; 250/492.2
[58] Field of Search .................... 219/121.35, 121.11, 219/121.12, 121.15, 121.16, 121.17, 121.25, 121.26, 121.29, 121.13, 121.74; 378/138; 250/492.2, 492.3, 398

[56] References Cited

U.S. PATENT DOCUMENTS

| | | | |
|---|---|---|---|
| 3,714,416 | 1/1973 | Link et al. | 219/121.35 |
| 3,875,416 | 4/1975 | Spicer | 219/121.35 |
| 4,328,411 | 5/1982 | Haller et al. | 219/121.35 |
| 4,469,950 | 9/1984 | Taylor et al. | 250/492.2 |
| 4,607,380 | 8/1986 | Oliver | 378/138 |
| 5,149,976 | 9/1992 | Sipma | 250/492.2 |

Primary Examiner—Tu Hoang
Attorney, Agent, or Firm—Henry P. Sartorio; L. E. Carnahan

[57] ABSTRACT

An apparatus and method for electron beam (EB) machining (drilling, cutting and welding) that uses conventional EB guns, power supplies, and welding machine technology without the need for fast bias pulsing technology. The invention involves a magnetic lensing (EB optics) system and electronic controls to: 1) concurrently bend, focus, shape, scan, and rotate the beam to protect the EB gun and to create a desired effective power-density distribution, and 2) rotate or scan this shaped beam in a controlled way. The shaped beam power-density distribution can be measured using a tomographic imaging system. For example, the EB apparatus of this invention has the ability to drill holes in metal having a diameter up to 1000 μm (1 mm or larger), compared to the 250 μm diameter of laser drilling.

22 Claims, 2 Drawing Sheets

ELECTRON BEAM MACHINING USING ROTATING AND SHAPED BEAM POWER DISTRIBUTION

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to the machining of metals, particularly to machining of metals by high power-density beams, and more particularly to an apparatus and method for machining of metals using a conventional (non-pulsed) electron beam machine combined with a magnetic lensing system and beam shaping and rotating control electronics.

Applying high power-density beams to the machining of metals has been primarily performed using pulsed laser technology. Pulsed laser technology is commonly used for cutting and welding of relatively thin materials with numerous commercial applications. Applications also exist for laser drilled holes in the automotive and aerospace industries. However, laser drilling is limited to small diameter holes (typically less than 250 μm) in thin sheets (<1 mm) and the process is somewhat slow, requiring many pulses to form each hole.

Presently there is interest in pulsed electron beam (EB) drilling of holes because of the potential for a higher drilling rate and the ability to drill wider holes (up to 1,000 μm). Pulsed EB cutting has also been proposed. However, these methods require the development of fast bias transformers and power circuits to pulse the beam and successfully vaporize and remove material from the drilled hole or channel being cut. Thus, there is a need for EB machining that does not require these fast bias transformers and associated power circuits, thus eliminating the need for fast bias pulsing technology for EB machining. The present invention satisfies the above-mentioned need by providing an apparatus and method for EB machining (drilling, cutting, and welding) that can use conventional EB guns, power supplies, and welding machine technology without the use of the fast bias pulsing technology. Basically, the invention involves the use of conventional (non-pulsed) EB machines in combination with a magnetic lensing (EB optics) system, and beam shaping and rotating control electronics, which can produce deeper and wider drill holes than can be produced by pulsed laser technology while at the same time maintaining the high-power-density advantages of the laser process.

SUMMARY OF THE INVENTION

It is an object of the invention to provide an electron beam apparatus for the machining of metals.

It is a further object of the invention to produce, by an apparatus using an electron beam, drilled holes having an extremely smooth and highly reflective wall surface.

It is a further object of the invention to provide a method for machining metals using a conventional electron beam machine utilizing beam optics and electronic controls.

A further object of the invention is to provide a means, utilizing an electron beam, for producing deeper and wider drill holes than can be produced by a laser beam system while maintaining the high-power-density advantages of the laser system.

Another object of the invention is to carry out the machining of metals by a conventional, non-pulsed, electron beam machine in combination with a magnetic lensing system and beam shaping and rotating control electronics.

Another object of the invention is to provide an electron beam metal machining apparatus and method using beam optics and electronic controls to focus, shape and scan the beam to create a desired power-density distribution, and to rotate or scan the thus shaped beam to create a desired effective power-density distribution.

Other objects and advantages will become apparent from the following description and accompanying drawings which set forth the principles of the invention. The apparatus of the invention basically comprises an electron beam (EB) gun, bending magnets for redirecting the beam away from the EB gun axis, and beam focusing, shaping, and rotating means, whereby an EB from the gun functions to act upon a workpiece for drilling, cutting, or welding. The EB gun is of the type used in a conventional (non-pulsed) EB machine similar to those used for EB welding. The invention incorporates beam optics and electronic controls to: 1) focus, shape and scan the beam to create a desired effective power-density distribution; and 2) rotate and/or scan this shaped beam in a controlled way. The shaped beam power-density distribution can be measured using a tomographic imaging system, such as described and claimed in copending U.S. application Ser. No. 07/996,892, filed Dec. 28, 1992, entitled "A System For Tomographic Determination Of The Power Distribution In Electron Beams", now U.S. Pat. No. 5,382,895 issued Jan. 17, 1995, and assigned to the same assignee; and as described in document UCRL-JC-111341, Tomographic Imaging of Non-Circular and Irregular Electron Beam Power Density Distribution, J. W. Elmer et al., August 1992.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

The invention is directed to electron beam (EB) machining (drilling, cutting, and welding) that can use conventional EB guns, power supplies, and welding machine technology. The apparatus of the invention comprises a conventional (non-pulsed) EB machine, similar to those used for EB welding, a magnetic lensing (EB optics) system, and beam optics and electronic controls. The magnetic lensing system functions to bend the beam from the gun of the EB machine away from the gun axis for preventing damage to the gun. The beam optics and electronic controls functions to focus, shape and scan the beam to create a desired power-density distribution; and to rotate or scan the thus shaped beam in a controlled way.

The thus shaped and rotated beam can drill into the material in a way analogous to that of a drill bit mechanically boring a hole, and will produce relatively large, deep and precise holes at rapid drilling rates (0.1 mm/s to 10 mm/s). Cutting can be performed by translating the workpiece under the shaped/rotating beam at a rate (1 mm/s to 1 m/s) that allows full penetration of the workpiece. Similarly, slotting can be performed by translating the workpiece under the rotating beam at a rate (1 mm/s to 1 m/s) that allows partial penetration of the workpiece. The above rates are dependent upon material type, beam current, beam accelerator voltage, desired hole or slot size, and depth. Welding can be improved by this technique. Using a low power rotating beam can minimize the turbulence observed in the keyhole of conventional EB welds.

Figure 1:
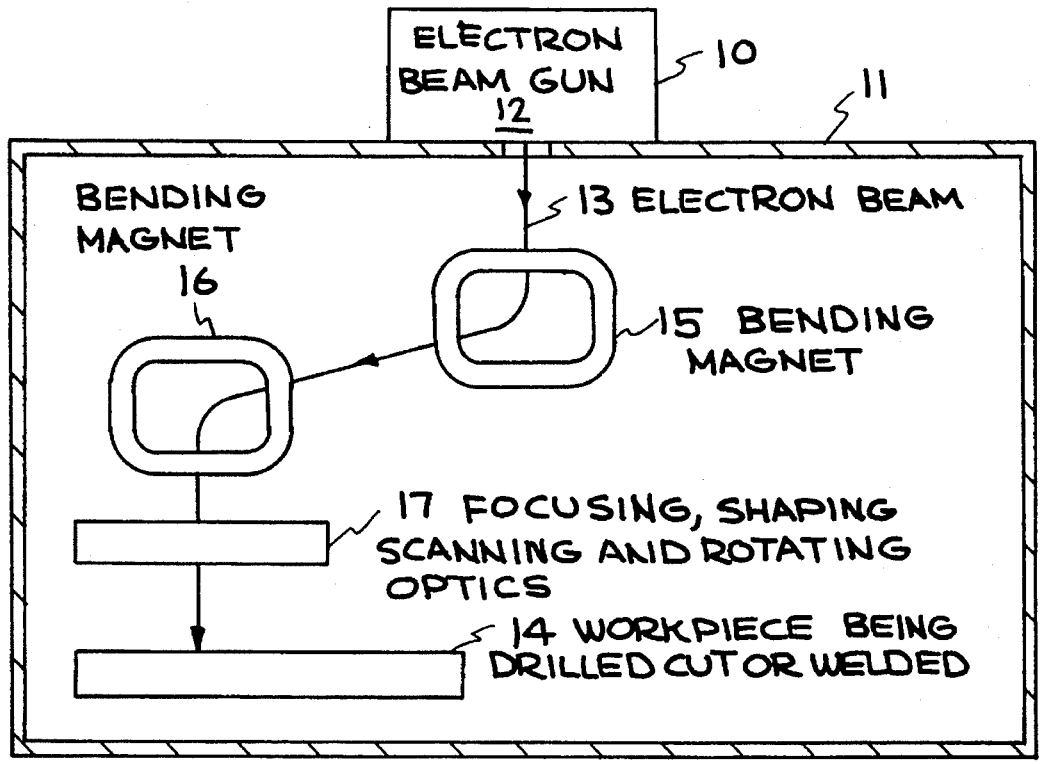
FIG. 1 is a simplified schematic illustration of the basic apparatus of the invention with the bending magnets and the shaping and rotating optics installed as an add-on in the vacuum chamber of an electron beam welding machine.
Figure 3:
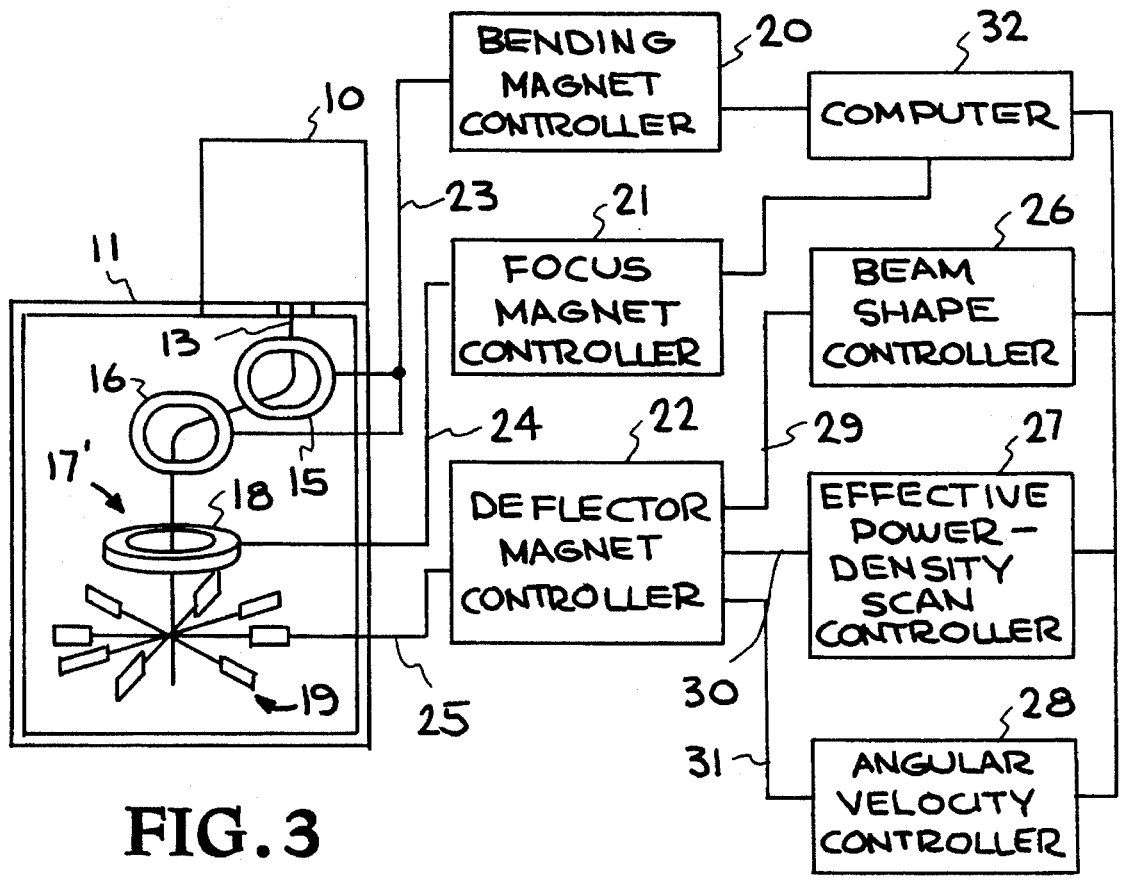
FIG. 3 schematically illustrates an embodiment of the apparatus of the invention incorporating a bending magnet controller, a focus magnet controller, and an octopole magnet controller into which is fed signals relative to beam shape, power density, and angular velocity.

As illustrated in FIGS. 1 and 3, beside the conventional EB machine, connected to a welding chamber, the invention consists of two principle components: magnetic lensing (EB optics) system and beam shaping and rotating control electronics. The simplified apparatus illustrated in FIG. 1 comprises an EB machine 10 mounted on a welding chamber 11, with the EB machine 10 including an EB gun 12 which produces a beam 13 directed onto a workpiece 14 in chamber 11, via a pair of bending magnets 15 and 16 and shaping and rotating optics, indicated at 17. Only one or a number of bending magnets can be used.

The magnetic lensing system may either be integrated with the EB gun 12 in machine 10, such as used for EB drilling, cutting and welding; or it may be an add-on, as shown in FIG. 1, to a conventional EB welding machine to add high performance EB drilling, cutting and welding capabilities. The bending magnets 15 and 16 bend the beam 13 away from the axis of gun 12 to prevent metal vapor from jetting up the gun column. The shaping and rotating optics 17 includes separate magnetic lens and deflectors, as seen in FIG. 3, which continuously shapes, focuses, scans, and rotates the beam 13 in a controlled way. Thus, FIG. 1 illustrates a typical location of the bending magnets and the beam shaping and rotating optics in the welding chamber 11 for an add-on configuration.

Figure 2A:
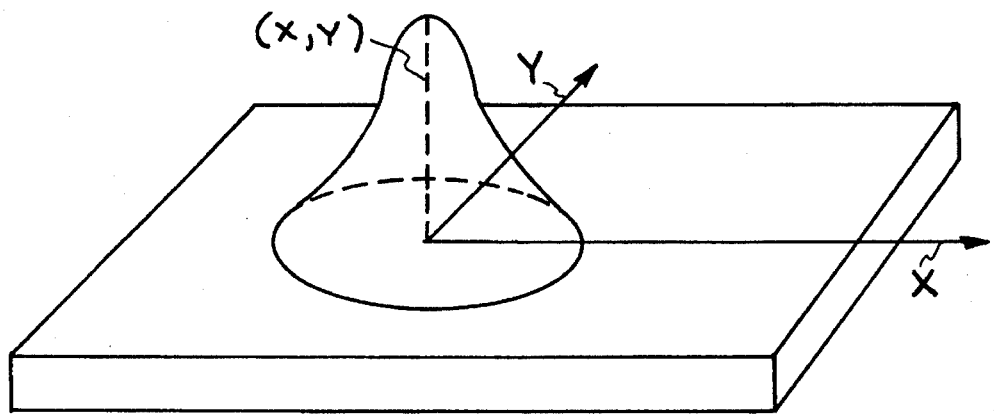
FIG. 2a graphically illustrates the current density distribution in a Gaussian beam.
Figure 2B:
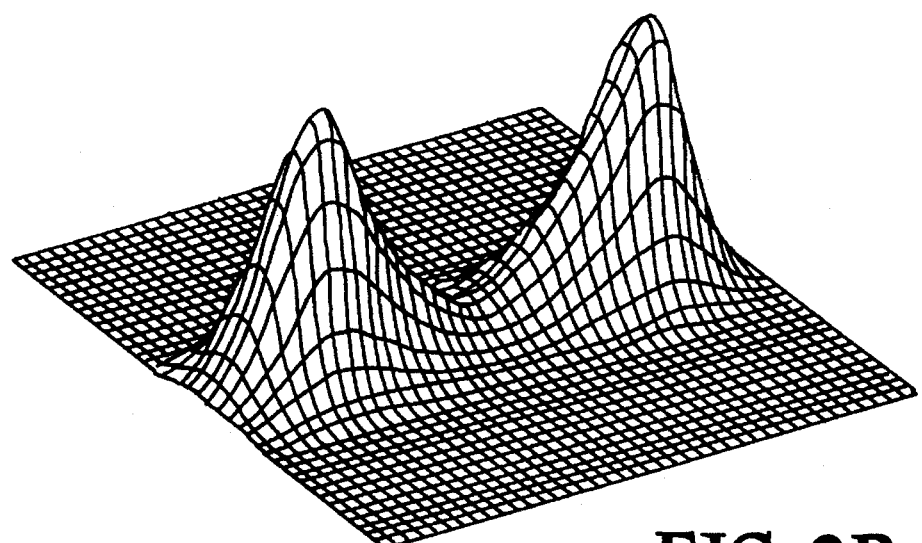
FIG. 2b graphically illustrates the effective electron beam power-density distribution as formed by the shaping and scanning optics of FIG. 1.
Figure 2C:
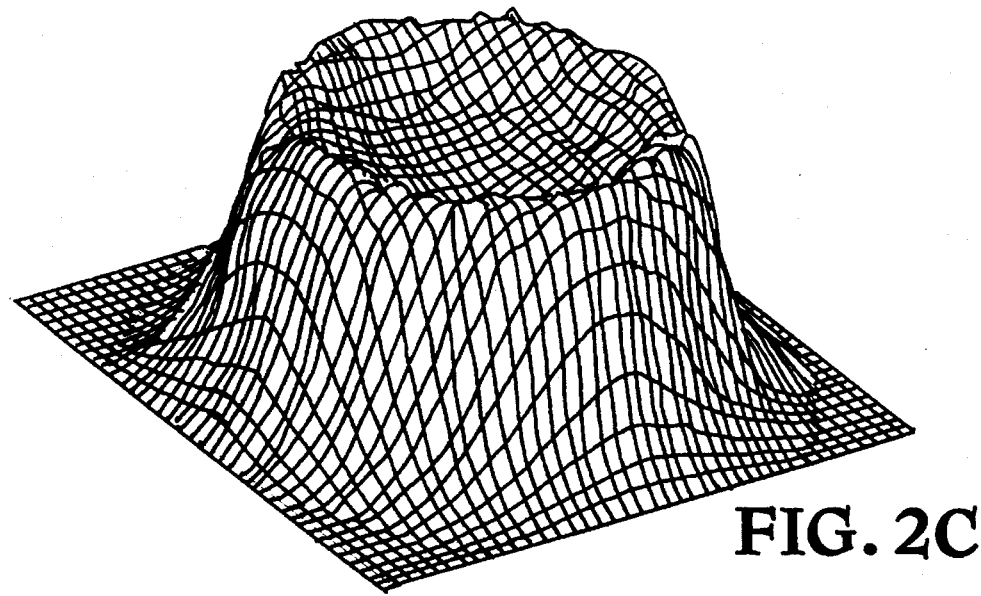
FIG. 2c graphically illustrates the energy distribution on the workpiece of FIG. 1, as the beam is rotated at a controlled speed about the center axis for a drilling application.

FIG. 2a illustrates a Gaussian current distribution curve in a beam on the x, y surface. FIG. 2b shows the effective power-density distribution (beam shape) developed with this invention for EB machining (drilling, cutting, slotting, welding), as the beam is shaped or scanned back and forth. FIG. 2c shows the resulting energy distribution shown in FIG. 2b rotated at a fixed angular velocity. The shaped beam power-density distribution (FIG. 2b) can be measured using the tomographic imaging techniques described in above-referenced U.S. application Ser. No. 07/996,892, now U.S. Pat. No. 5,382,895 issued Jan. 17, 1995 and UCRL-JC-111341, as well as in an article by A. Teruya, J. Elmer and D. O'Brien, entitled "A System For The Tomographic Determination Of The Power Distribution In Electron Beams", Proceedings of the Conference on The Laser and Electron Beam in Welding, Cutting and Surface Treatment-State of the Art 1991, published by Bakish Materials Corporation, 1992.

FIG. 3 illustrates in greater detail the magnetic lensing system, and the shaping and rotating optics of FIG. 1, as well as the control electronics therefore. Similar components to those of FIG. 1 have been given similar reference numerals. As seen in FIG. 3, the magnetic lensing system consists of electro-magnetic assemblies generally indicated at 17' in addition to bending magnets 15 and 16, these assemblies including electromagnets for directing, shaping, and focusing the beam 13 after it passes through bending magnets 15 and 16, which function only to redirect the beam 13 away from the axis of EB gun 12 to protect the gun. The assemblies generally indicated at 17' include an electro-magnet 18 for focusing the beam 13 and an octopole type deflector magnet configuration 19, or other similar magnet arrangement, which alternatively scans, compresses and expands the beam 13, creating the effective power-density distribution for drilling during beam rotation. The magnetic beam shaping and rotation is controlled by an electronics package and, optionally, computer control software, as described herein after. The electronic package consists of three (3) independent controllers 20, 21 and 22 for the beam bending magnets 15 and 16, the focus magnet 18, and the beam shaping, scanning and rotating deflector magnet 19, as indicated by respective lines or leads 23, 24 and 25. Controller 22 is in turn controlled by a beam shape controller 26, a power-density scan controller 27 and an angular velocity controller 28 as indicated by respective leads or lines 29, 30 and 31. Each of the controllers 20, 21, 26, 27 and 28 may be connected to an appropriate computer system 32, for example. Controller 20 for the beam bending magnets 15 and 16 establish static magnetic fields to put the beam 13 off the EB gun 12 axis and on the workpiece 14 (see FIG. 1). Controller 21 for focus magnet 18 brings the static beam 13 to fine focus. Sensors, not shown, for detecting penetration depth can provide feedback via controller 20, controller 22, and/or computer 32 to the focus controller to dynamically change focal length and point of sharp focus and maintain scan distance as drilling progresses. Controller 22 for the beam shaping, scanning and rotating octopole deflector configuration 19 creates the desired power-density distribution and rotation of the beam 13.

In operation of the apparatus of FIG. 3, the beam bending magnet controller 20 via magnets 15 and 16 puts the beam 13 off axis with the EB gun 12 and onto the workpiece 14 being drilled, cut, or welded. The focus controller 21 via magnet 18 maintains fine beam focus. The beam shaping, scanning and rotating is dynamically controlled by octopole magnet controller 22 (via octopole deflector magnet 19) which accepts beam shape parameters from the beam shape controller 26; a scanning wave form from the power-density scan controller 27; and a rotational angle signal from the angular velocity controller 28. The parameters of the various controllers are established by computer 32 or a set point control arrangement.

The theory behind EB machining in accordance with the present invention is as follows: The power-density of the shaped beam incident on the workpiece is high enough to vaporize the material, similar to the way a vapor cavity keyhole is created in conventional high power-density welding. A vapor pressure gradient is formed outward from where the rotating beam vaporizes the material of the workpiece. The vaporized material is expelled at a very high velocity away from the beam, up the channels formed on either side of the scanning beam and out of the hole being drilled. The very high vapor expulsion rate of the rotating beam lowers the resistance to the electron beam penetration into the hole. This avoids superheating the escaping vapor which creates back pressure and turbulence in the melted material. It also allows the beam to penetrate deeper into the workpiece material without excessively widening, melting, or deforming the walls of the hole being drilled. The rotational speed, the drilling, cutting or welding parameters, and the beam focus and shape all influence the quality of the hole. They further depend on the types of material being drilled and the geometric shape of the workpiece.

By way of example, for a drilling application, with a workpiece constructed of tungsten having a geometric shape of 6 mm thick plate, and with the EB gun producing a beam having an accelerating voltage of 50 kV and a beam current of 50 mA, beam shape would be Gaussian with a beam diameter of 0.5 mm, scanned back and forth across a 4 mm length, and rotated at a rotational speed of 100 Hz, will produce a hole having a depth of 6 mm, width of 4 mm, with the drilling being carried out at the rate of 1 mm per second. The drill hole thus produced has an exceptionally smooth and highly reflective wall surface.

With further development of the present invention, EB machining can be controlled through a feedback coupled sensing system that detects vapor velocity, temperature, and other secondary effects and adjusts the electron beam parameters to compensate for variations in the process. Adaptive controls via the computer 32 and controllers 2–22 and 26–28, can be used to maintain the effective power-density distribution and energy being dissipated at the bottom of the keyhole.

It has thus been shown that this invention provide an apparatus and method for precision drilling deep holes in hard materials with high aspect ratios, as well as the potential for fabrication of precision components. It is thus seen that electron-beam drilling using the present invention is an alternative to laser drilling for automotive, aerospace, and energy machining applications. This invention can produce deeper and wider holes than can be produced by lasers while at the same time maintaining the high-power-density advantages of the laser process. In addition, the drill holes produced by this invention have smooth, reflective wall surfaces.

In addition to the drilling of precision holes, the present invention may find other applications that use the vapor being expelled from the hole for vapor coating substrates. In such an application, the very high velocity vapor jet that is created by the drilling process would provide a source of metallic vapor for coating substrates and for manufacturing thin metallic films at high deposition rates. Other uses for this efficient vaporization by EB machining of materials may include atomic vapor isotope separation.

While particular embodiments of the invention have been illustrated and described such is not intended to be limiting. Modifications and changes will become apparent to those skilled in the art, and it is intended that the scope of the invention be limited only by the scope of the appended claims.

We claim:

1. An apparatus for electron beam machining, comprising:
   means for producing an electron beam along a first axis;
   means for bending said beam along a second axis substantially parallel to said first axis and for directing the beam onto an associated workpiece;
   means for focusing the beam;
   means for shaping, scanning, and rotating the beam; and
   means for controlling said means for bending the beam, said means for focusing the beam, and said means for shaping, scanning, and rotating the beam.

2. The apparatus of claim 1, wherein said means for producing the electron beam includes an electron gun of an electron beam machine, and wherein said means for bending the axis of said beam includes at least one bending magnet, whereby the second axis of the beam when directed onto an associated workpiece is spaced from the first axis of said beam as produced by said electron gun.

3. The apparatus of claim 2, additionally including means for controlling said at least one bending magnet.

4. The apparatus of claim 1, wherein said means for focusing the beam and said means for shaping, scanning, and rotating the beam includes a magnetic lensing system and control electronics therefor.

5. The apparatus of claim 4, wherein said magnetic lensing system includes a focusing magnet, and wherein said control electronics includes a focus magnet controller.

6. The apparatus of claim 4, wherein said magnetic lensing system includes a deflector magnet configuration, and wherein said control electronics includes a deflector magnet controller.

7. The apparatus of claim 6, wherein said deflector magnet controller is connected to receive input signals from a beam shape controller, an effective power-density scan controller, and an angular velocity controller.

8. The apparatus of claim 7, wherein said means for controlling includes a computer operably connected to each of said beam shape controller, effective power-density scan controller, and angular velocity controller.

9. The apparatus of claim 8, wherein said computer is additionally connected to a focus magnet controller for controlling a focus magnet which focuses the electron beam and to a bending magnet controller for controlling a plurality of bending magnets which bend the axis of the beam.

10. An apparatus for electron beam machining, comprising:
    means for producing an electron beam along an axis;
    means for bending a first axis of said beam along another axis substantially parallel to said first axis and for directing the beam onto an associated workpiece;
    means for at least focusing, shaping, scanning, and rotating the beam including a magnetic lensing system and control electronics thereof;
    said magnetic lensing system including a deflector magnet configuration, and said control electronics including a deflector magnet controller,
    said deflector magnet configuration consisting of an octopole-type magnet configuration; and
    means for controlling said means for bending, and said means for at least focusing, shaping, and rotating the beam.

11. A method for electron beam machining, including the steps of:
    producing an electron beam along a first axis;
    bending the electron beam such that the beam passes along a substantially parallel second axis speed from said first axis;
    focusing the electron beam onto a workpiece to be machined thereby;
    controlling the shape of the beam, and rotating the beam.

12. The method of claim 11, wherein the step of producing the electron beam is carried out by activation of an electron beam machine.

13. The method of claim 11, wherein the step of bending the electron beam is carried out by providing at least one bending magnet, and providing means for controlling the bending magnets.

14. The method of claim 13, wherein the step of focusing the electron beam is carried out by providing a focusing magnet, and providing means for controlling the focusing magnet.

15. The method of claim 14, wherein the steps of controlling the shape of the beam and rotating the beam are carried out by providing a deflector magnet configuration, and providing means for controlling the deflector magnet configuration.

16. The method of claim 15, wherein the step of providing means for controlling the bending magnets, the focusing magnet, and the deflector magnets is carried out by providing a controller for the magnets, and connecting each of the controllers to a computer.

17. The method of claim 15, wherein the step of providing means for controlling the deflector magnets is carried out by, providing a controller for the magnet and connecting the controller to a beam shape controller, an effective power-density scan controller, and an angular velocity controller.

18. The method of claim 17, additionally including the step of connecting a computer for controlling each of the means for controlling a magnet.

19. The method of claim 15, additionally including the step of connecting a computer so as to control each of the means for controlling a magnet.

20. The method of claim 15, additionally including the step of forming the deflector magnet configuration so as to have an octopole-type magnet configuration.

21. An electron beam machine using a rotating and shaped beam power distribution for producing a source of metallic vapor for coating thin films at high deposition rates, comprising:

an electron gun for producing an electron beam along a first axis;

means for bending the electron beam so as to be directed along a second and parallel axis to said first axis and onto a material for producing a metallic vapor therefrom;

means for focusing the electron beam; and means for shaping and scanning the electron beam;

whereby the thus produced metallic vapor is expelled from a hole in a material onto which the electron beam is directed thereby forming a very high velocity vapor jet as a source of metallic vapor for coating substrates and fabricating thin metallic films.

22. The electron beam machine of claim 21, wherein said means for bending, focusing, shaping and scanning the electron beam includes a magnetic lensing system and control electronics therefor.

* * * * *